United States Patent [19]

Gerlinger

[11] 4,151,703
[45] May 1, 1979

[54] MACHINE FOR TEDDING AND/OR WINDROWING CUT FODDER

[75] Inventor: Frédéric Gerlinger, Ottersthal, France

[73] Assignee: Kuhn, S.A., Saverne, France

[21] Appl. No.: 772,960

[22] Filed: Feb. 28, 1977

[30] Foreign Application Priority Data

Mar. 4, 1976 [FR] France ............................. 76 07289

[51] Int. Cl.² ......................................... A01D 79/00
[52] U.S. Cl. .................................................. 56/370
[58] Field of Search .................. 56/370, 377, 365–367

[56] References Cited

U.S. PATENT DOCUMENTS

4,056,923  11/1977  Zweegers ............................. 56/370

FOREIGN PATENT DOCUMENTS

1457953  9/1972  Fed. Rep. of Germany ............ 56/370
450791  4/1968  Switzerland ............................. 56/370

*Primary Examiner*—russell R. Kinsey
*Attorney, Agent, or Firm*—Young & Thompson

[57] ABSTRACT

The disclosure is of a haymaking machine for the tedding and/or windrowing of fodder, comprising especially a support beam extending transversely of the direction of travel of the machine and at least four rake wheels equipped with working tools which are driven in rotation so as to rotate in directions such that any two adjacent wheels rotate in opposite directions, especially with the purpose of forming two windrows in a single passage, characterized in that each of the central rake wheels is fixed to the extremity of a support arm the other extremity of which is connected to a pivot spindle situated on the transverse support beam, the said support arms being capable of being brought by pivoting about their pivot spindles into at least two positions, the one corresponding to a first working position of the machine in which the two extremities of the support arms are respectively situated on either side of the central plane of the machine, and the other corresponding to a second working position of the machine in which the two extremities of the support arms are situated on the same side in relation to the said central plane of the machine.

8 Claims, 7 Drawing Figures

MACHINE FOR TEDDING AND/OR WINDROWING CUT FODDER

INTRODUCTION AND BACKGROUND OF THE INVENTION

The present invention relates to a haymaking machine for the tedding and/or windrowing of fodder, comprising especially a support beam extending transversely of the direction of travel of the machine and at least four rake wheels equipped with working tools and driven in rotation so as to rotate by pairs in opposite directions, especially with the purpose of forming two windrows in one single passage.

In a known machine, each central rake wheel is connected to one and the same reversing gear unit by means of a support arm made in two parts fitted one into the other, of which one is fast with the said gear unit and the other is fast with the said central rake wheels. In order to transpose the machine from a first working position into a second working position, the central rake wheels must be withdrawn from the parts of the support arms fast with the gear unit and then refitted one in place of the other. This operation is delicate and irksome for the user, especially by reason of the weight of the rake wheels. Furthermore it represents a significant loss of time for each transposition.

In another known machine the rake wheels situated on the same side of the central plane of the machine are interconnected by means of a support arm which is articulated on the transverse support beam of the machine. In order to transpose the machine from a first working position into a second working position, it is necessary on the one hand to pivot the mutually interconnected rake wheels through a certain angle in relation to the transverse support beam, about the articulation axis of their support arm, and on the other to reverse the direction of rotation of the central rake wheels. Thus this arrangement necessitates the utilisation of reversing gear units in order to be able to change the direction of rotation of the said central rake wheels. Furthermore in this machine the positions of the working tools of the central rake wheels must be modified individually so that they are subjected to constraints directed towards the same direction in the two working positions, which represents a lengthy and tedious task for the user.

In a final known machine the central rake wheels are interconnected by means of a support arm which is articulated at its centre on the chassis of the machine. In order to transpose the machine from a first working position into a second working position, the central rake wheels are pivoted together through 180° about the articulation axis of their support arm. Then the outer rake wheels are pivoted forward—seen in the direction of travel of the machine—about pivot spindles disposed on the transverse support beam. This arrangement does not permit of modification of the inter-axial distance between the mutually interconnected central rake wheels, on the occasion of changes of working position. Now it is desirable that this interaxial distance should be capable of being modified during the transpositions from one working position into the other working position, since in the first position, in which the machine can ted the fodder and/or form two windrows in one single passage, it is preferable to have a small interaxial distance between the central rake wheels in order that there may be no unworked zone causing especially a loss of fodder, and in the second working position, in which the machine can form a central windrow, it is preferable to have a great interaxial distance between the said central rake wheels in order to favour the formation of a windrow of large volume. Moreover each transposition of this machine from one working position into the other working position necessitates numerous manipulations including the uncoupling of the cardan shaft which effects the rotation drive of the take wheels from the power take-off of the driving tractor.

The purpose of the present invention consists in obtaining a haymaking machine of the kind described in the introduction which does not possess the above-mentioned drawbacks of the known machines.

BRIEF SUMMARY OF THE INVENTION

To this end an important characteristic of the invention consists in that each of the central rake wheels is fixed to the extremity of a support arm, the other extremity of which is connected to a pivot spindle situated on the transverse support beam, the said arms being capable of being brought by pivoting about their pivot spindles into at least two positions, the one corresponding to a first working position of the machine in which the two extremities of the support arms are situated respectively on either side of the central plane of the machine, and the other corresponding to a second working position of the machine in which the two extremities of the support arms are situated on the same side in relation to the said central plane.

FURTHER DESCRIPTION AND ADVANTAGES OF THE INVENTION

According to this arrangement the machine according to the invention can be transposed from a first working position in which for example it can ted the fodder and/or form two windrows in one single passage, into a second working position in which it can form a central windrow, without it being necessary to remove, reverse and refit the central rake wheels or reverse the direction of rotation of the central rake wheels, also the position of their working tools. Moreover this arrangement permits of easily varying (without necessitating telescopic transmission elements) the interaxial distance of the central rake wheels during transposition of the machine from one working position into the other.

Further characteristics and advantages of the invention will appear from the following description of a form of embodiment of the invention given by way of non-limitative example, with referance to the accompanying drawings.

BRIEF DESCRIPTION OF THE VIEWS IN THE DRAWINGS

Figure 3:
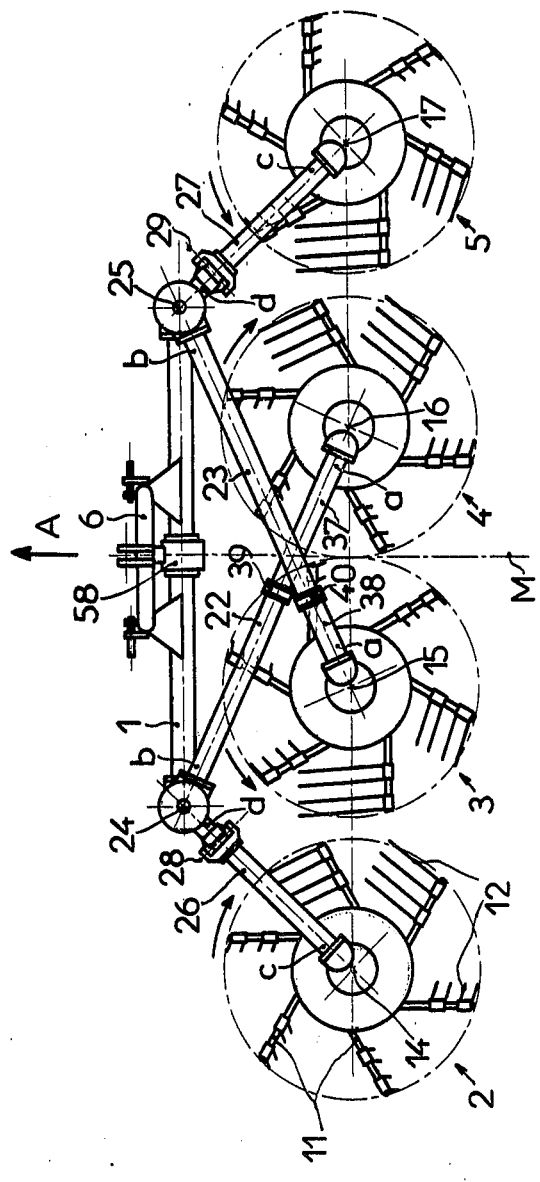
Figure 4:
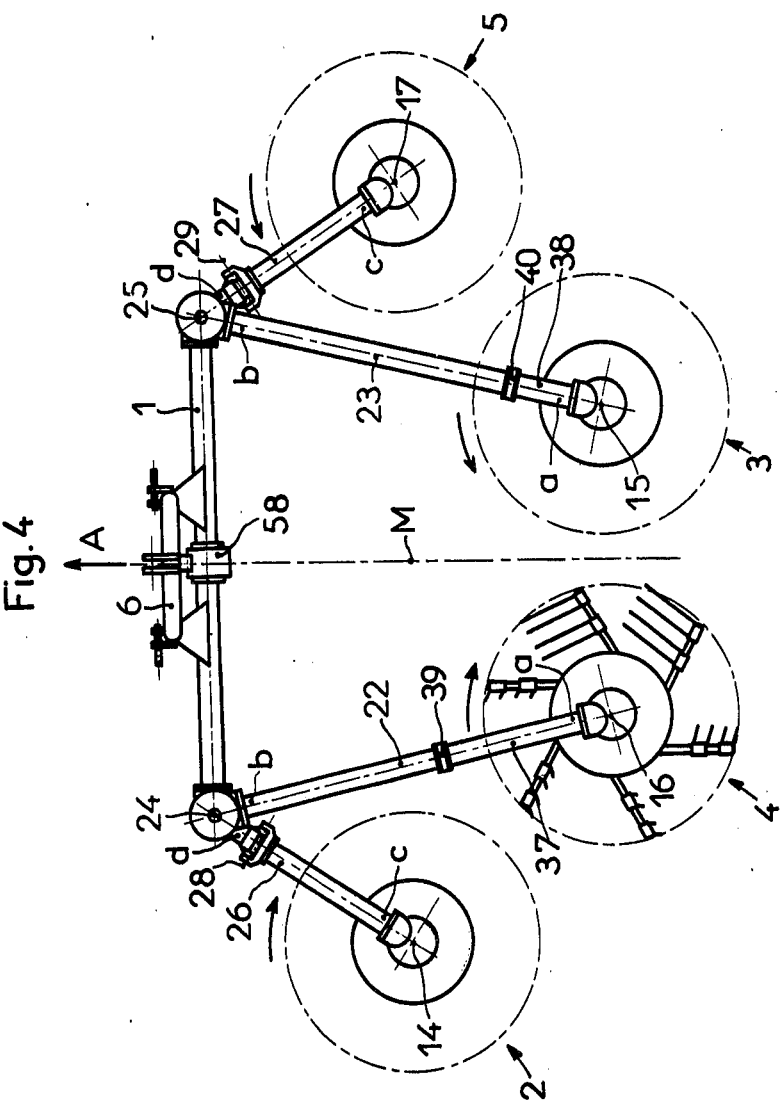
Figure 5:
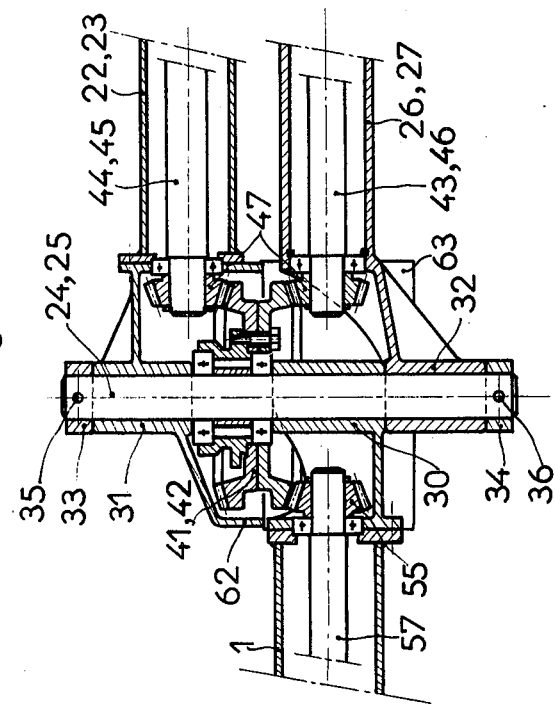
Figure 6:
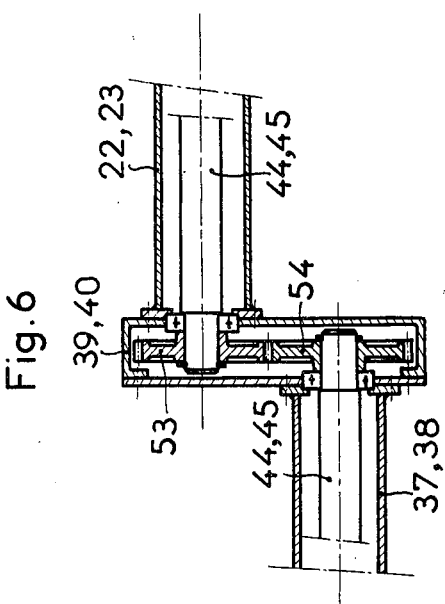
Figure 7:
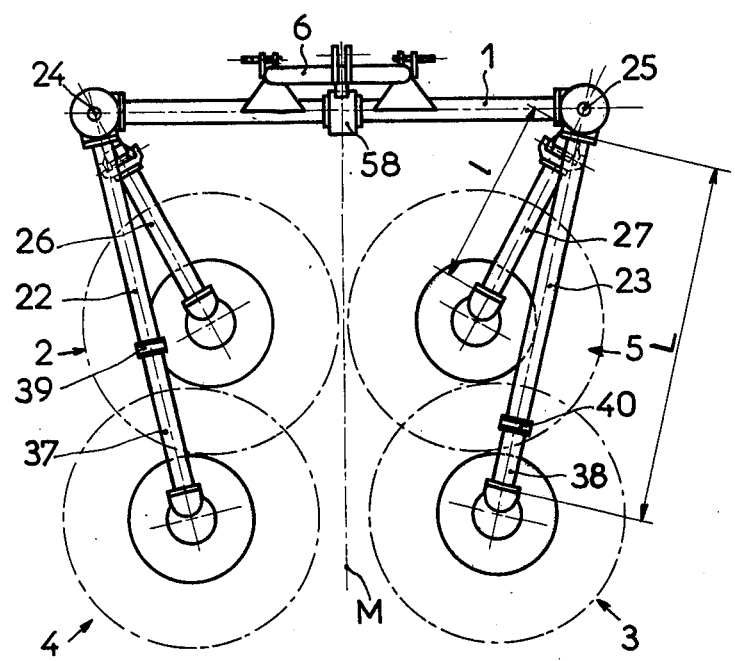

FIG. 3 represents a plan view of a machine according to the invention in the first working position in which the working tools occupy a position appropriate to the formation of two windrows in a single passage, FIG. 4 represents a plan view of a machine according to the invention in a second working position in which the working tools occupy a position appropriate for the formation of a central windrow of great volume, FIG. 5 represents a broken-away section of the articulation of the support arms of the rake wheels on the transverse support beam, FIG. 6 represents a section of a gear box disposed on the support arms of the central rake wheels, FIG. 7 represents a plan view of a machine according to the invention in the transport position.

DETAILED DESCRIPTION OF THE PREFERRED EMBODIMENTS

The haymaking machine for tedding and/or for windrowing fodder according to the invention, as represented in FIGS. 1 to 4 and 7, comprises especially a support beam 1 extending transversely of the direction of travel of the machine—represented by the arrow A in the said Figures—and four rake wheels 2, 3, 4 and 5 driven in rotation. This machine can be coupled to the three-point linkage device of a propelling tractor (not shown) by means of a prop 6 connected to the said transverse support beam 1. Beneath each rake wheel 2, 3, 4 and 5 there is disposed a support wheel 7, 8, 9 and 10 permitting the machine to move over the ground especially during work. Each rake wheel 2, 3, 4 and 5 is equipped with arms 11 carrying working tools 12 such as forks, tines or analogous elements. In the example of embodiment as described below, the arms 11 carrying working tools 12 are mounted for pivoting in support bearings 13 and comprise, at their ends towards the rotation axis 14, 15, 16 or 17 of the corresponding rake wheel 2, 3, 4 or 5, a control crank 18 provided with a roller 19 which moves in a guide cam 20. The said control cranks 18 are connected to the arms 11 carrying working tools 12, by means of articulations 21 permitting of bringing the said carrier arms 11 into two working positions in relation to the said control cranks 18, the one position appropriate to tedding (FIGS. 1 and 2) in which the control cranks 18 keep the working tools 12 in a position substantially perpendicular to the ground over their whole trajectory, and the other appropriate to windrowing (FIGS. 3 and 4) in which the said control cranks 18 cause the working tools 12 to pivot, under the action of the rollers 19 and the guide cam 20, through the intermediary of their carrier arms 11, over a partial area of their trajectory upwards and in the direction opposite to the direction of rotation of the corresponding rake wheel 2, 3, 4 and 5, in order that the said working tools 12 may deposit the fodder in the form of a windrow. Moreover the transposition of the working tools 12 from the tedding position into the windrowing position causes a reduction of the diameter of the trajectories described by the said working tools 12, in order to favour the formation of the windrows.

It is apparent that it will be possible to use other principles permitting of transposing the working tools 12 from a position appropriate to tedding into a position appropriate to windrowing and vice versa without departing from the scope of the present invention.

According to the invention each of the central rake wheels 3 and 4 is fixed to the extremity a of a support arm 22 and 23, the other extremity b of which is connected to a pivot spindle 24 and 25 situated on the transverse support beam 1, the said support arms 22 and 23 being capable of being brought by pivoting about their pivot spindles 24 and 25 into at least two positions, the one of these positions corresponding to a first working position of the machine (FIGS. 1, 2 and 3) in which the two extremities a and b of the support arms 22 and 23 are situated respectively on either side of the central plane M of the machine, and the other of these positions corresponding to a second working position of the machine (FIG. 4) in which the two extremities a and b of the support arms 22 and 23 are situated on the same side in relation to the said central plane M of the machine.

Thus for the transposition of the machine from a first working position into a second working position, each central rake wheel 3 and 4 is pivoted by means of its support arm 22 and 23 towards the rear of the machine—seen in the direction of travel A of the machine—about the pivot spindles 24 and 25 in such manner that the rake wheels 2 and 4 and the rake wheels 3 and 5, which rotate in the same direction, are situated on the same side in relation to the central plane M of the machine. The said rake wheels 2, 3, 4 and 5 are then disposed in V-form so that the fodder raked by the outer rake wheels 2 and 5 is taken up by the central rake wheels 3 and 4 which complete the formation of the windrow.

By virtue of this arrangement the transposition of the machine from the first working position in which the support arms 22 and 23 of the central rake wheels 3 and 4 cross one another so that the rake wheels 2, 3, 4 and 5 are substantially aligned and rotate by pairs in opposite directions in order to be able to carry out excellent tedding work and/or to form two windrows of small volume between the rake wheels 2, 3 and 4, 5 in a single passage of the machine, according to whether the working tools 12 are in the position appropriate for tedding or for windrowing, into the second working position in which a central windrow of large volume can be formed between the central rake wheels 3 and 4 when the working tools are situated in the position appropriate for windrowing, is effected in an extremely simple manner which requires few adjustments and no physical force of the user, so that even a woman can carry out this transposition.

In fact on this machine there is no need to remove, reverse and refit the central rake wheels 3 and 4 or reverse the direction of rotation of the said central rake wheels 3 and 4 in order to carry out the said transpositions. Moreover the working tools 12 of the central rake wheels 3 and 4 are subjected to constraints directed towards the same direction in the two working positions, without any need to reverse their position. Furthermore in the second working position it is easily possible to modify the interaxial distance of the central rake wheels 3 and 4 according to the volume of the windrow to be produced, by pivoting the support arms 22 and 23 about the pivot spindles 24 and 25.

In order to transpose the machine from the second working position into the first working position, each central rake wheel 3 and 4 is pivoted forward—seen in the direction of travel A of the machine—by means of its support arm 22 and 23 about the pivot spindles 24 and 25 in such manner that the rake wheels 2 and 4 and the rake wheels 3 and 5, which rotate in the same directions of rotation, are respectively situated on either side of the central plane M of the machine so as to rotate in opposite directions by pairs.

According to a characteristic of the invention the outer rake wheels 2 and 5 are fixed to the extremities c of support arms 26 and 27 the other extremities d of which are respectively articulated about the pivot spindles 24 and 25 situated on the transverse support beam 1. This characteristic permits of bringing the outer rake wheels 2 and 5 closer to the central rake wheels 3 and 4 by a slight pivoting towards the rear of the machine about the pivot spindles 24 and 25, by means of their support arms 26 and 27, so as to avoid any loss of fodder between the said outer rake wheels 2 and 5 and the said central rake wheels 3 and 4 during the formation of a central windrow of large volume (FIG. 4). Conversely when the machine is transposed from the second working position into the first working position, the outer rake wheels 2 and 5 are pivoted forward so that all the rake wheels 2, 3, 4 and 5 are substantially aligned in this position.

The above-mentioned pivotings of the outer rake wheels 2 and 5 are optional or even unnecessary for example in the case where the interaxial distance between the central rake wheels 3 and 4 in the second working position of the machine is quite large and permits the working tools 12 of these wheels to partially overlap the zones worked by the working tools 12 of the outer rake wheels 2 and 5.

The support arms 26 and 27 of the outer rake wheels 2 and 5 can advantageously comprise a substantially horizontal pivot spindle 28 and 29 permitting the said rake wheels 2 and 5 to follow variations of level of the ground.

Figure 1:
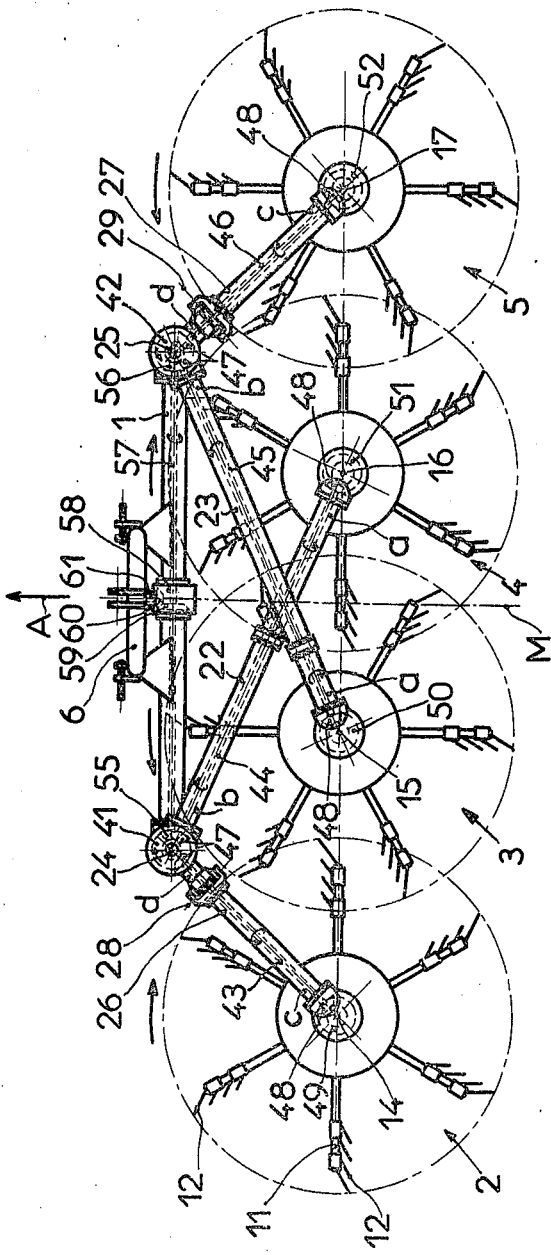
FIG. 1 represents a plan view of a machine according to the invention in a first working position in which the working tools occupy a position appropriate for tedding.
Figure 2:
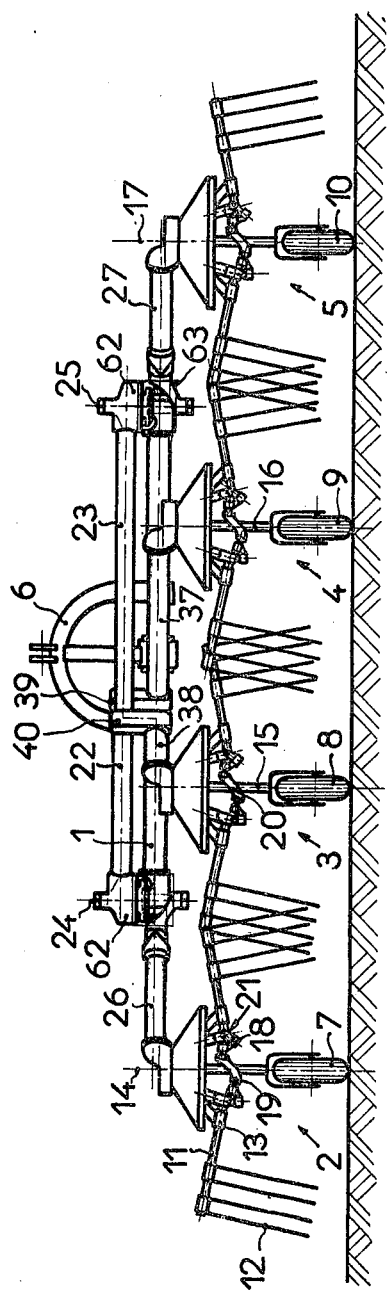
FIG. 2 represents a rear view of the machine as represented in FIG. 1.

According to an important characteristic of the invention the support arms 22, 26 and 23, 27 of the rake wheels 2, 4 and 3, 5 which rotate in the same direction of rotation are respectively articulated about the same pivot spindle 24 or 25 situated on the transverse support beam 1 of the machine. This arrangement permits a relatively simple and thus unburdensome construction. The said pivot spindles 24 and 25 are respectively situated on either side of the central plane M of the machine and are connected to the transverse support beam 1 by means of support bearings 30. The support arms 22 and 23 of the central rake wheels 3 and 4 are respectively articulated about the pivot spindles 24 and 25 by means of support bearings 31 disposed above the support bearings 30 connecting the said spindles 24 and 25 to the transverse support beam 1 and the support arms 26 and 27 of the outer rake wheels 2 and 5 are respectively articulated about the pivot spindles 24 and 25 by means of support bearings 32 disposed below the said support bearings 30 (FIG. 5). The two bearings 31 and 32 of the support arms 22, 23, 26 and 27 are held on the pivot spindles 24 and 25 by means of rings 33 and 34 and retainer pins 35 and 36 placed at the two ends of the said pivot spindles 24 and 25. By virtue of this assembly the support arms 22 and 23 of the central rake wheels 3 and 4 are situated at least partially in a plane farther from the ground than the plane in which the support arms 26 and 27 of the outer rake wheels 2 and 5 are situated. Thus the said support arms 22, 23 and 26, 27 can pivot freely in relation to one another about the pivot spindles 24 and 25 during the transpositions of the machine from the first working position into the second working position and vice versa. However, in order that it may be possible to use rake wheels 2, 3, 4 and 5 all having the same height, the outer parts 37 and 38 of the support arms 22 and 23 of the central rake wheels 3 and 4 are brought into the same plane as the support arms 26 and 27 of the outer rake wheels 2 and 5 by means of gear boxes 39 and 40. This arrangement further permits the said support arms 22 and 23 of the central rake wheels 3 and 4 to pass one over the other in the first working position of the machine. By virtue of this arrangement of the rake wheels 2, 3, 4 and 5 and of their respective support arms 22, 23, 26 and 27, the rotating drive of the said rake wheels 2, 3, 4 and 5 can be effected in a relatively simple manner (FIGS. 1 and 5). To this end on each pivot spindle 24 and 25 there is provided a double ring gear 41 and 42 which respectively drives the rake wheels 2, 3, 4 and 5 in rotation by means of drive shafts 43, 44, 45 and 46 which are lodged in the support arms 22, 23, 26 and 27 of the said rake wheels 2, 3, 4 and 5. Each of these drive shafts 43, 44, 45 and 46 comprises at its end nearer the double ring gear 41 and 42 a bevel pinion 47 which is in engagement with one ring of the said gear 41 and 42, and at its other end a bevel pinion 48 in engagement with one of the ring gears 49, 50, 51 or 52 fast respectively with the drive hubs of the rake wheels 2, 3, 4 or 5. In the gear boxes 39 and 40 situated on the support arms 22 and 23 of the central rake wheels 3 and 4 there are provided two toothed wheels 53 and 54 which effect the transmission of the drive between the two parts of the drive shafts 44 and 45 which are lodged in the said support arms 22 and 23 (FIG. 6). Each gear ring 41 and 42 is itself driven in rotation by means of bevel pinions 55 and 56 disposed on the ends of a drive shaft 57 which is lodged in the transverse support beam 1 and is driven in rotation in a central gear box 58 disposed on the said transverse support beam 1. For this purpose this drive shaft 57 comprises on its part entering the central gear box 58 a bevel pinion 59 which is in engagement with a bevel pinion 60 disposed on a shaft end portion 61 extending outside the said central gear box 58 and capable of being connected to the power take-off of the driving tractor by means of a cardan shaft (not shown). The gear 41 and 42 can be protected for example by means of a guard 62 fast with the support bearings 31 of the support arms 22 and 23 of the central rake wheels 3 and 4, and by a sheath 63 of flexible material which is fixed on the support bearings 30 connecting the pivot spindles 24 and 25 to the transverse support beam 1, and comprising a groove for the passage of the support arms 26 and 27 of the outer rake wheels 2 and 5.

According to an important characteristic of the invention the length L of the support arms 22 and 23 of the central rake wheels 3 and 4 is greater than the length l of the support arms 26 and 27 of the outer rake wheels 2 and 5. This characteristic permits especially of transposing the machine according to the invention into a transport porition in which its overall width is relatively slight (FIG. 7). For this purpose the central rake wheels 3 and 4 are pivoted by means of their support arms 22 and 23 towards the rear of the machine—seen in the direction of travel A—about the pivot spindles 24 and 25 situated on the transverse support beam 1, substantially into the position which they occupy in the second working position of the machine, and then the outer rake wheels 2 and 5 are pivoted by means of their support arms 26 and 27 towards the rear and towards the central plane M of the machine, about the said pivot spindles 24 and 25, so that the said outer rake wheels 2 and 5 place themselves substantially before the central rake wheels 3 and 4. In this position it is preferable to bring the working tools 12 of the rake wheels 2, 3, 4 and 5 into the position appropriate for windrowing, since in this position the diameter of their trajectory is smaller than in the tedding position.

In each of the working positions of the machine and in its transport position the support arms 22, 23, 26 and 27 of the rake wheels 2, 3, 4 and 5 can be locked in their respective positions by means of known devices (not shown) such as tie rods connecting the said support arms to the transverse support beam 1.

What is claimed is:

1. In a haymaking machine for the tedding and/or windrowing of fodder, comprising a support beam extending transversely to the direction of travel of the machine and at least two pairs of rake wheels supported on said support beam, the rake wheels of each pair formed by two neighbouring wheels when all rake wheels are substantially aligned in a direction parallel to said beam, being driven in rotation in opposite directions so as to converge forwardly; the improvement in which each of the central rake wheels (3 and 4) is fixed to the end (a) of an auxiliary frame beam (22 and 23) the other end (b) of which is connected to a pivot (24 and 25) situated on the transverse support beam (1), the said auxiliary frame beams (22 and 23) being capable of being brought by pivoting about their pivots (24 and 25) into at least two positions, the one corresponding to a first working position of the machine in which the two ends (a and b) of each auxiliary frame beam (22 and 23) are situated on opposite sides of the central plane (M) of the machine, and the other corresponding to a second working position of the machine in which the two ends (a) and (b) of auxiliary frame beam (22 and 23) are situated on the same side of the said central plane (M) of the machine.

2. A machine according to claim 1, in which in the first working position of the machine the auxiliary frame beams (22 and 23) of the central rake wheels (3 and 4) cross one another as viewed in plan.

3. A machine according to claim 1, in which the auxiliary frame beams of the rake wheels which rotate in the same direction of rotation are articulated about a common pivot (24 or 25) on said transverse support beam.

4. A machine according to claim 3, in which there are two said common pivots one disposed on each side of the central plane (M) of the machine.

5. A machine according to claim 1, in which the auxiliary frame beams (22 and 23) of the central rake wheels (3 and 4) are situated at least partially in a plane farther from the ground than the plane in which the auxiliary frame beams (26 and 27) of the outer rake wheels (2 and 5) are situated.

6. A machine according to claim 5, in which the outer parts (37 and 38) of the auxiliary frame beams (22 and 23) of the central rake wheels (3 and 4) are returned into the same plane as the auxiliary frame beams (26 and 27) of the outer rake wheels (2 and 5) by means of gear boxes (39 and 40) in order that all rake wheels (2, 3, 4 and 5) may have the same height above the ground.

7. A machine according to claim 3, in which on each pivot (24 and 25) there is disposed a double ring gear (41 and 42) which respectively drives the rake wheels (2, 3, 4 and 5) in rotation by means of drive shafts (43, 44, 45 and 46) lodged in the auxiliary frame beams (22, 23, 26 and 27), the said double ring gear (41 and 42) itself being driven in rotation by means of a drive shaft (57) which is lodged in the transverse support beam (1) and is driven in rotation in a central gear box (58) situated on the said transverse support beam (1).

8. A machine according to claim 1, characterized in that the length (L) of the auxiliary frame beams (22 and 23) of the central rake wheels (3 and 4) is substantially greater than the length (l) of the auxiliary frame beams (26 and 27) of the outer rake wheels (2 and 5).

* * * * *